US005387440A

United States Patent [19]

Takemoto et al.

[11] Patent Number: 5,387,440

[45] Date of Patent: Feb. 7, 1995

[54] NOZZLE PLATE FOR INK JET RECORDING APPARATUS AND METHOD OF PREPARING A SAID NOZZLE PLATE

[75] Inventors: Kiyohiko Takemoto; Miharu Yoshida; Shuichi Yayaguchi; Takeshi Kobayashi; Masanori Kamijo; Akio Yamamori, all of Nagano, Japan

[73] Assignee: Seiko Epson Corporation, Tokyo, Japan

[21] Appl. No.: 38,631

[22] Filed: Mar. 29, 1993

Related U.S. Application Data

[62] Division of Ser. No. 858,633, Mar. 27, 1992.

[30] Foreign Application Priority Data

Mar. 28, 1991 [JP] Japan .................................. 3-089522
Mar. 19, 1992 [JP] Japan .................................. 4-093720

[51] Int. Cl.⁶ .............................................. G01D 15/18
[52] U.S. Cl. ................................. 427/443.1; 205/127; 347/45
[58] Field of Search ............. 205/75, 127; 346/140 R; 347/45; 427/443.1

[56] References Cited

U.S. PATENT DOCUMENTS 4,296,421 10/1981 Hara ................................ 346/140 R
4,368,476 1/1983 Uehara ............................ 346/140 R
4,583,690 4/1986 You ...................................... 239/690
4,623,906 11/1986 Chandrashekhar .................. 347/47
4,658,269 4/1987 Rezanka ............................. 346/75
4,728,392 3/1988 Miura ................................. 156/644
4,890,126 12/1989 Hotomi ........................... 346/140 R

FOREIGN PATENT DOCUMENTS 55-65564 5/1980 Japan .
22068 2/1982 Japan .
57-107848 7/1982 Japan .
58-124661 7/1983 Japan .
60-183161 9/1985 Japan .
61-248753 11/1986 Japan .
255140 2/1990 Japan .

OTHER PUBLICATIONS

European Patent Application 0 359 365 A1 to Tektronix, Inc. Mar. 21, 1990.

*Primary Examiner*—John Niebling
*Assistant Examiner*—Brendan Mee
*Attorney, Agent, or Firm*—Sughrue, Mion, Zinn, Macpeak & Seas

[57] ABSTRACT

The entire part of a rear surface 2 of a nozzle plate 1 excluding peripheral portions 6 of nozzle holes 4 is coated with a resist tape, and this nozzle plate 1 is immersed in an electrolytic solution in which ions of a metal and particles of a water-repellent resin are dispersed to provide a plating thereon, and the plated nozzle plate 1 in the electrolytic solution is then heated to a temperature that is higher than a melting point of the water-repellent resin, whereby an entire portion extending from a front surface 3 of the nozzle plate 1 and the nozzle holes 4 contiguous to the front surface to the rear surface 2 is provided with a eutectoid plating layer 8 to suppress deviation of the passage of ink droplets due to wetting by an ink or the like.

3 Claims, 2 Drawing Sheets

NOZZLE PLATE FOR INK JET RECORDING APPARATUS AND METHOD OF PREPARING A SAID NOZZLE PLATE

This is a divisional of application Ser. No. 07/858,633 filed Mar. 27, 1992.

BACKGROUND OF THE INVENTION

1. Field of the Invention

The invention relates to a nozzle plate adapted for an ink jet recording apparatus and a method of preparing such nozzle plate. More particularly, it is directed to a nozzle plate on which a water-repellent coating is provided on both the front surface of the nozzle plate and on the inner surface of the nozzles and to a method of preparing such nozzle plate.

2. Prior Art

An ink jet printer has a problem that when a portion around a nozzle is wetted by an ink, the direction of splashing ink droplets gets deviated. To overcome this problem, Japanese Patent Unexamined Publication No. 65564/1980 or 55140/1990 has proposed an art that contributes to suppressing generation of such wetting by the ink while providing a water-repellent coating on the surface of the nozzle plate.

However, to form such a coating, the rear surface of the nozzle plate must be masked to facilitate adhesion of an adhesive. With nozzle holes having been arranged on a member to be coated, it is difficult to cover a portion around the holes completely. Under such circumstances, part of the water-repellent coating provided on the front surface is extended into the inner surfaces of the nozzle holes unevenly, making the ink meniscuses to be formed inside the respective nozzle holes to be different from one nozzle hole to another and disadvantageously causing variations in ink jetting timing.

Further, a technique in which a coating material is embedded in each nozzle hole completely so that a water-repellent coating is provided only on the front surface of the nozzle plate causes the coating to forman edge-like protrusion around the rim portion of each nozzle hole. Thus, when such rim portion is wiped, the edge-like protrusion is chipped off, making the wettability locally different with resultant inconsistent ink splashing directions.

Still further, the provision of the water-repellent film only on the front surface of the nozzle plate causes inconsistent affinity at the exit of each nozzle hole, making the meniscus position unstable.

SUMMARY OF THE INVENTION

An object of the invention is to provide a novel nozzle plate that does not cause variations in both the direction of splashing ink droplets and the timing of jetting the ink droplets.

To achieve the above object, the invention is applied to a nozzle plate in which not only the front surface of the nozzle plate but also the inner surface of each nozzle hole are provided with a water-repellent coating uniformly.

Another object of the invention is to allow the meniscus of an ink to be formed more stably inside each nozzle hole.

To achieve this object, the invention is applied to a nozzle plate in which the water-repellent coating extending from the front surface of the nozzle plate to the inner surface of each nozzle plate is further extended to a portion around the ingress of each nozzle hole.

Still another object of the invention is to propose a novel method of forming a coating on a nozzle plate in which a water-repellent coating is formed uniformly from the portion around the ingress of each nozzle hole not only to the inner surface of the nozzle hole but also to the front surface of the nozzle plate.

To achieve this object, the invention is applied to a method comprising the steps of: providing a coating on the rear surface of a nozzle plate with a coating material excluding each nozzle hole and a portion around such nozzle hole to thereby form a uniform water-repellent coating on the front surface of the nozzle plate, the inner surface of each nozzle hole contiguous to the front surface, and the portion around the nozzle hole contiguous to the rear surface of the nozzle plate.

DETAILED DESCRIPTION OF THE PREFERRED EMBODIMENTS

Figure 1:
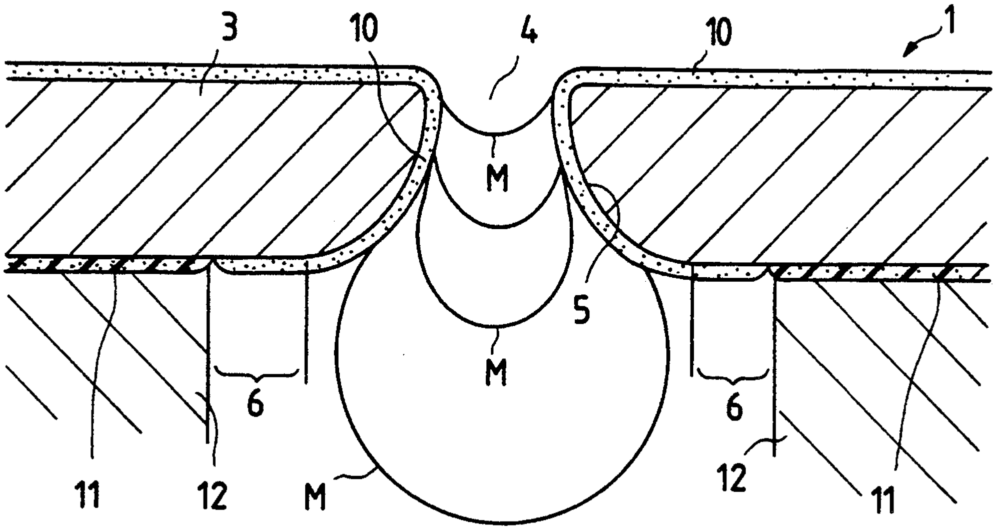
FIG. 1 is an enlarged sectional diagram showing a main portion of a nozzle plate, which is an embodiment of the invention.

FIG. 1 shows a nozzle plate, which is an embodiment of the invention, and FIGS. 2 (*a*) to (*e*) show its preparing processes.

The processes for preparing the nozzle plate will be described first with reference to FIGS. 2 (*a*) to (*e*).

In FIGS. 2 (*a*) to (*e*), a nozzle plate 1 is made of such a material as metal, ceramic, silicon, glass, or plastic, and preferably of a single metal such as titanium, chromium, iron, cobalt, nickel, copper, zinc, tin, gold, or of an alloy such as a nickel-phosphor alloy, a tin-copper-phosphor alloy (phosphor bronze), a copper-zinc alloy, or a stainless steel; of polycarbonate, polysulfone, an ABS resin (acrylonitrile butadiene-styrene copolymer), polyethylene terephthalate, polyacetal; and various photosensitive resins. This nozzle plate has a plurality of nozzle holes 4, each consisting of an inverted funnel-like portion on a rear surface 2 and a thinly opened orifice portion on a front surface 3.

In this nozzle plate 1 a resist tape 8 is stuck onto the rear surface 2 as appropriate excluding the nozzle holes 4 and their peripheral portions 6 (FIG. 2 (*b*)).

That is, on the rear surface 2 of the nozzle plate 1 is the resist tape 8 bonded, the resist tape 8 having a multiplicity of such large-diameter holes 7 as to allow the funnel-like portions and its peripheral portions 6 to be exposed toward the flat rear surface 2. Each hole 7 may be formed by punching after the resist tape 8 has been bonded onto the nozzle plate 1.

The nozzle plate 1 with the resist tape 8 bonded thereon is cleaned with an acid, and then dipped into an electrolytic solution in which nickel ions and particles of a water-repellent high molecular weight polymeric resin such as polytetrafluoroethylene are dispersed by electric charges to be eutectoid plated on the front surface while stirring the electrolytic solution (FIG. 2 (*c*)).

A fluorine-containing high weight polymer molecule to be used for the eutectoid plating includes: polytetrafluoroethylene, polyperfluoroalkoxybutadiene, polyfluorovinylidene, polyfluorovinyl, polydiperfluoroalkyl fumarate, and resins shown by the following chemical formulas 1, 2, 3, 4, and 5, used singly or in mixture.

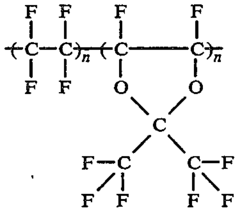

(1)

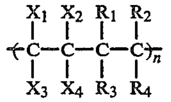

(2)

where at least two of X1 to X4 are fluorine or perfluoroalkyl group, and the R1 to R4 are hydrocarbon substituents (including hydrogen and halogen.

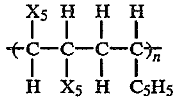

(3)

where $X_5$ is $COOC_mF_{2m+1}$(m=1−20)

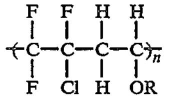

(4)

where R is alkyl group.

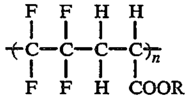

(5)

where R is alkyl group.

There is no particular limit on the matrix for a coating layer, allowing a metal to be selected from the group consisting of nickel, copper, silver, zinc, tin, and the like. Preferably, however, nickel, a nickel-cobalt alloy, a nickel-phosphor alloy, a nickel-boron alloy, and the like, having good surface hardness and high wear resistance, should be selected.

Accordingly, the particles of polytetrafluoroethylene form a uniform plating on the front surface 3 of the nozzle plate 1, the inner surface 5 of each nozzle hole 4, and the rear surface 2 portion exposed from the hole 7 of the resist tape 8 by means of the nickel ions. Then, while suppressing warpage of the nozzle plate 1 by applying a load to the nozzle plate 1, the nozzle plate 1 in the electrolytic solution is heated to a temperature over the melting point of polytetrafluoroethylene, i.e., 350° C.

As a result, the particles of polytetrafluoroethylene are fused on the front surface 3 of the nozzle plate 1, the inner surface 5 of each nozzle hole 4, and the peripheral portion 6 of the nozzle hole 4, forming there an ink-repellent plating layer 10 that is smooth and hard.

The fluorine-containing high molecular weight eutectoid plating layer 10, if too thin, exhibits inadequate ink repellency on the surface having an ink jetting outlets, while if too thick, it affects accuracy in the diameter of each ink jetting outlet. Therefore, the thickness of the plating 10 on the surface is designed to be controlled in the order of 1 to 10 μm.

Further, it is preferable that the eutectoid amount of fluorine-containing high molecule in the plating layer 10 be up to 60 vol.%, more particularly, from 10 to 50 vol.%.

An eutectoid plating method may include electroless plating and electroplating. From the consideration that an ink including an ink jet recording ink is used and that ions such as $Li^+$, $Na^+$, $K^+$, $Ca^{2+}$, $Cl^-$, $SO_4^{2-}$, $SO_3^{2-}$, $NO_3^-$, $NO_2^-$ are mixed therein as impurities, it is desirable to employ the electroplating method that is less affected by ionic products and provides highly durable plating.

Further, to prevent warpage of the nozzle plate 1 caused when the fluorine-containing high molecule eutectoid plated nozzle plate 1 is heated to a temperature over the melting point of the fluorine-containing high molecule, it is proposed that a pressure of 100 $gf/cm^2$ or more, preferably, a pressure of 500 $gf/cm^2$, be applied onto the nozzle plate 1.

The ink-repellent plating layer 10 formed on the front surface 3 of the nozzle plate 1 and the inner surface 5 of each nozzle hole 4 in this way further reaches the rear surface 2 of the nozzle plate 1, where it is spread over the peripheral portion 6 of each nozzle hole 4.

As a result, the entire part of a portion extending from the periphery to the inner portion of each nozzle hole 4 exhibits a uniform surface condition, so that the meniscus M oscillates largely by, e.g., a variation in the pressure within an ink chamber, and even if this causes the meniscus M to retreat toward the ink chamber in the vicinity of the funnel-like portion as shown in FIG. 1, the stable spherical surface of the meniscus M is maintained, allowing a high-frequency recording and writing to be made without causing deviation in the passage of ink droplets nor omission of dots.

Therefore, as the resist tape 8 is removed from the rear surface 2 of the nozzle plate 1 thereafter and the nozzle plate 1 is adhesively fixed on a substrate 12 while applying an adhesive 11 on the portion from which the tape was removed, so that an ink jet recording head is implemented.

Figure 3A:
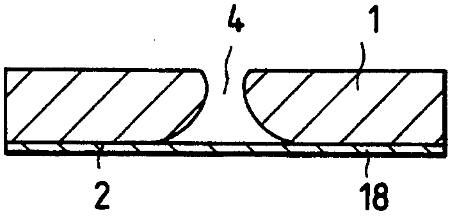
FIG. 3 (*a*) to (*c*) are diagrams showing a masking process.
Figure 3B:
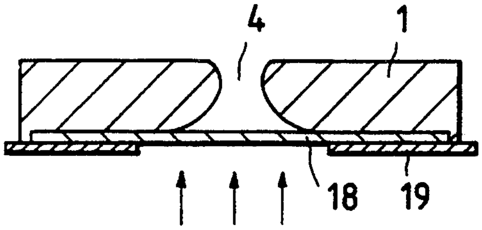
Figure 3C:
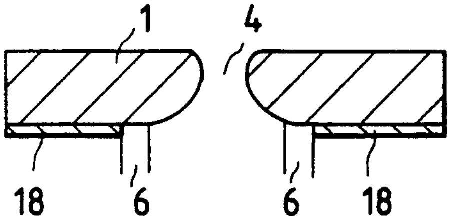
Figure 2A:
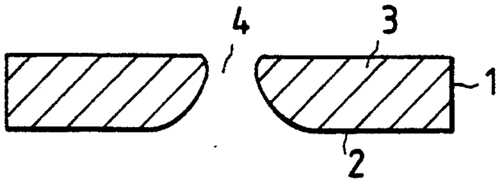
FIG. 2 (*a*) to (*e*) are diagrams showing processes for providing a water-repellent coating onto surfaces of the nozzle plate.
Figure 2B:
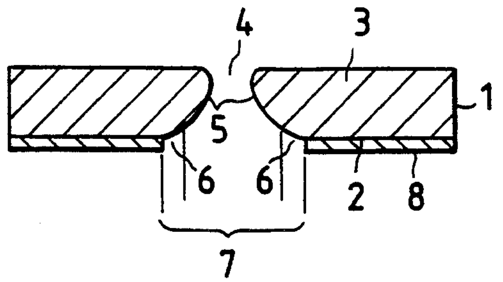
Figure 2C:
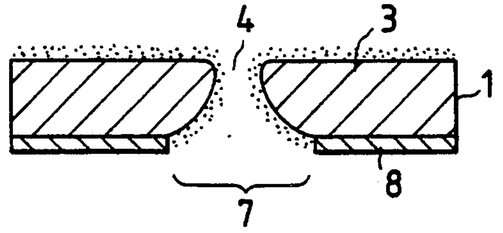
Figure 2D:
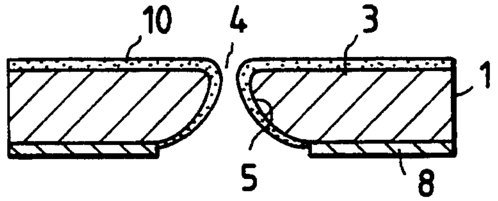
Figure 2E:
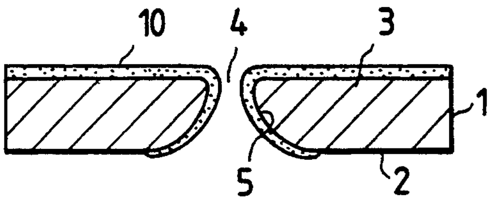

FIGS. 3 (*a*) to (*c*) show another means for coating the rear surface 2 of the nozzle plate 1.

As in the ordinary masking method, this coating means involves the steps of applying a liquid resist material 18 over the entire part of the rear surface 2 of the nozzle plate 1 (FIG. 3 (*a*)), applying a masking layer 19 over portions of the resist material 18 leaving an exposed portion, exposing the peripheral portion 6 (FIG. 3 (b)), and removing by fusion the exposed portion. As a result, as shown in FIG. 3 (*c*), only the portion to which the adhesive was applied can be coated.

While this coating means is employed to provide the above-mentioned eutectoid plating layer 10 on the nozzle plate 1, ink-repellent coating forming means other than this can, of course, be used.

Specifically, ink-repellent coating forming means other than the above includes a method of applying a fluororesin by dipping. While this ink-repellent coating has a shortcoming that it is weak to externally applied mechanical action such as wiping compared with the eutectoid plating, this coating with its low melting point allows the nozzle plate 1 to be made from a material that is comparatively less heat-resistant such as a synthetic resin.

What is claimed is:

1. A method of preparing a nozzle plate having at least one nozzle hole in which a meniscus is formed for an ink jet recording apparatus, comprising the steps of:

coating a rear surface of a nozzle plate with a coating material excluding both said nozzle hole thereof and a portion around said nozzle hole; and providing an ink-repellent coating film uniformly on a front surface of said nozzle plate, an inner surface of said nozzle hole contiguous to said front surface, and said portion around said nozzle hole contiguous to a rear surface of said nozzle plate, said film having a surface condition such that a stable substantially spherical surface of the meniscus is maintained.

2. A method of preparing a nozzle plate for an ink jet recording apparatus according to claim 1, further comprising the steps of dipping said nozzle plate coating with said coating material in a fluorine-containing high molecular weight polymeric solution and/or a fluorine-containing high molecular weight polymeric dispersion; and forming a fluorine-containing high molecular weight polymeric coating on said surfaces and portion of said nozzle plate.

3. A method of preparing a nozzle plate for an ink jet recording apparatus according to claim 1, further comprising the steps of first immersing said nozzle plate coating with said coating material in an electrolytic solution in which ions of a metal and particles of a fluorine-containing high molecular weight resin are dispersed; and then heating said electrolytic solution to a temperature being equal to or higher than a melting point of said fluorine-containing high molecular weight resin to form a fluorine-containing high molecule eutectoid plating on said surfaces and portion of said nozzle plate.

* * * * *

UNITED STATES PATENT AND TRADEMARK OFFICE

CERTIFICATE OF CORRECTION

PATENT NO. : 5,387,440 
DATED : February 7, 1995
INVENTOR(S) : Kiyohiko Takemoto et al.

It is certified that error appears in the above-identified patent and that said Letters Patent is hereby corrected as shown below:

Title page,
Item [75], Inventors: please change the 3rd inventor from "Shuichi Yayaguchi"
to -- Shuichi Yamaguchi --

Signed and Sealed this

Eleventh Day of February, 2003

JAMES E. ROGAN
*Director of the United States Patent and Trademark Office*